Patented Jan. 21, 1936

2,028,420

UNITED STATES PATENT OFFICE 2,028,420

ARSENATE CEMENT OR CEMENT MIXTURE

Johan Bertil Stålhane, Stockholm, Sweden, assignor to Bolidens Gruvaktiebolag, Stockholm, Sweden, a limited joint-stock company of Sweden No Drawing. Application February 25, 1935, Serial No. 8,079. In Sweden January 13, 1934

4 Claims. (Cl. 106—24)

The present invention relates to hydraulically binding cements or cement mixtures containing calcium arsenate (compound of quinquevalent arsenic) together with lime, calcium silicate, f. i. in the form of blast furnace slag, Portland cement, aluminate cement or similar calcareous products for technical purposes. The calcium arsenate used for the purpose in question may suitably have a composition corresponding to meta-arsenate ($CaO \cdot As_2O_5$) and/or pyroarsenate ($2CaO \cdot As_2O_5$), or an intermediate or neighbouring composition, i. e. "acid" arsenates with deficiency of lime in relation to the tri-basic arsenic acid. Upon the hydrating the "acid" arsenate fixes lime and is converted into difficultly soluble orthoarsenate ($3CaO \cdot As_2O_5 \cdot aq$). The setting time can be regulated with the "degree of acidity" of the arsenate. Good properties may be obtained with cements or cement mixtures containing 20 to 80 percentage by weight of calcium arsenate.

It has been previously proposed to use arsenious acid (compound of trivalent arsenic) for the production of a difficultly soluble and cheap cement and such cement types have also been worked out, in the production of which it has proved in some respects to be particularly suitable to use, on the one hand, a mixture of 70 parts by weight of Portland cement together with 30 parts by weight of arsenious acid ($As_2O_3$) and, on the other hand, a mixture of 75 to 80 parts by weight of dicalcium silicate (chiefly of gamma type) together with 25 to 20 parts of arsenious acid. There has also been ascertained a considerable reduction of the solubility of such a mixture as compared with ordinary Portland cement, which reduction may be owing to the formation of difficultly soluble calcium arsenites (for instance $2CaO \cdot As_2O_3 \cdot aq$). As regards the Portland cement mixture, the formation of the calcium arsenite implies a simultaneous fixation of the "excess" of lime arising upon the hydrating of the Portland cement. However, these arsenious acid cements have also certain undesirable properties. The strength is less than f. i. that of Portland cement of class A; the cement as set is not quite resistant to carbonic acid (carbon dioxide), and, finally, the general fear of the poisonous effect of the arsenic, especially that of the arsenious acid, is a serious hindrance to their use in practice.

However, the arsenic cements are not affected with these disadvantageous properties. The strength and the low solubility are increased, since the calcium arsenates are more stable, better crystallizing and more difficultly soluble than the corresponding arsenite. The stability with relation to carbonic acid is greater than for arsenite. Last but not least, the fear of the poisonous effect may be met with the information as to the fact that, in the arsenate cements, the arsenic has been converted into compounds which, in fact, are not more dangerous than f. i. the red lead in common use in building engineering.

Having thus described my invention I declare that what I claim is:—

1. A cement mixture containing a calcium arsenate with a composition corresponding to one of the following: meta-arsenate ($CaO \cdot As_2O_5$) or pyroarsenate ($2CaO \cdot As_2O_5$), together with one of the following: lime, calcium silicate, Portland cement, aluminate cement.

2. Cements or cement mixtures as claimed in claim 1, characterized in that they contain 20 to 80 percentage by weight of calcium arsenate.

3. A cementitious mixture, comprising a calcium arsenate from among the calcium arsenate compounds intermediate the meta and the pyro, together with one of the following: lime, calcium silicate, Portland cement, aluminate cement.

4. A cementitious mixture, comprising a calcium arsenate from among the calcium arsenate compounds adjacent the meta and the pyro compounds, together with one of the following: lime, calcium silicate, Portland cement, aluminate cement.

JOHAN BERTIL STÅLHANE.